(12) United States Patent
Kuribayashi et al.

(10) Patent No.: US 6,245,173 B1
(45) Date of Patent: Jun. 12, 2001

(54) METHOD OF MOUNTING VEHICULAR WINDOW GLASS

(75) Inventors: Masao Kuribayashi, Tokyo; Takeshi Furuta, Saitama-ken; Keiichirou Maekawa, Saitama-ken; Shigenori Koseki, Saitama-ken, all of (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/422,856

(22) Filed: Oct. 25, 1999

Related U.S. Application Data

(62) Division of application No. 09/047,490, filed on Mar. 25, 1998, now Pat. No. 6,042,670.

(30) Foreign Application Priority Data

Mar. 27, 1997 (JP) .................................... 9-75840
Mar. 31, 1997 (JP) .................................... 9-80630

(51) Int. Cl.[7] .............................. B60J 1/00; B60J 10/02
(52) U.S. Cl. ............................................ 156/108; 156/71
(58) Field of Search ........................... 156/71, 108, 574; 296/84.1, 93, 201; 52/208

(56) References Cited

U.S. PATENT DOCUMENTS

| 3,925,947 | 12/1975 | Meyers et al. ..................... 52/208 |
| 4,184,000 | 1/1980 | Denman .......................... 428/347 |
| 5,906,697 | * 5/1999 | Hasegawa et al. ................ 156/108 |
| 6,001,204 | * 12/1999 | Halg et al. ....................... 156/108 |

FOREIGN PATENT DOCUMENTS

| 0 379 908 A2 | 8/1990 | (EP) . |
| 0 382 602 A1 | 8/1990 | (EP) . |
| 0 402 254 A1 | 12/1990 | (EP) . |
| 2 223 525 | 4/1990 | (GB) . |
| 60-219176 | 11/1985 | (JP) . |
| 2-28509 | 6/1990 | (JP) . |
| 4-62913 | 10/1992 | (JP) . |
| 5-41985 | 10/1993 | (JP) . |
| 7-81641 | 3/1995 | (JP) . |
| 8-225016 | 9/1996 | (JP) . |

\* cited by examiner

*Primary Examiner*—Sam Chuan Yao
(74) *Attorney, Agent, or Firm*—Armstrong, Westerman, Hattori, McLeland & Naughton, LLP

(57) ABSTRACT

A window glass of a vehicle, to which a hot melt adhesive agent is applied, is pushed while the window glass is held by a jig which is mounted on a robot. An allowable range of temperature of the adhesive agent is set between an upper limit and a lower limit. The upper limit is one at which the adhesive agent comes to have such a holding force above a predetermined value as to prevent deviation of the window glass. The lower limit is one at which a compression reaction force when a bead of the adhesive agent applied to the window glass is crushed to a predetermined thickness becomes smaller than a predetermined value. The adhesive agent is applied to the window glass at such a temperature that the temperature thereof at the time of completion of pushing of the window glass falls within the allowable range. The apparatus for mounting the window glass has a jig for the window glass which is provided at a front end of a robot arm. A coupling member couples the jig to the front end of the robot arm such that the jig is tiltable relative to the robot arm in a direction in which a bending moment due to a load on the front end of the robot arm is applied in a direction which is normal to the window portion of the vehicle. Restraining members restrain the tilting of said jig.

3 Claims, 8 Drawing Sheets

METHOD OF MOUNTING VEHICULAR WINDOW GLASS

This application is a division of prior application Ser. No. 09/047,490 filed Mar. 25, 1998, now U.S. Pat. No. 6,042,670.

BACKGROUND OF THE INVENTION

1. Field of the Invention

The present invention relates to a method of, and an apparatus for, mounting a vehicular window glass (or window pane) on a window portion in a vehicle body of a vehicle such as a motor vehicle or the like by means of an adhesive agent, particularly by means of a hot melt type of adhesive agent (hereinafter called a hot melt adhesive agent).

2. Description of the Related Art

As can be seen in Japanese Published Unexamined Patent Application No. 81641/1995, there has hitherto been known a method of mounting a window glass, which has applied or coated thereto an adhesive agent, on a window portion by pushing or forcing the window glass to a window frame of the window portion in a state in which the window glass is held by a jig which is mounted on a robot.

As the adhesive agent for the window glass, there is ordinarily used a moisture-hardened adhesive agent. However, since it takes time to harden the adhesive agent, the window glass is conventionally temporarily held in position by attaching a temporary holding member such as a fastener, or the like. This method has a disadvantage in that the number of parts and the number of working steps increase.

If a rapid-hardening adhesive agent is used, the temporary holding member becomes unnecessary, whereby the above-described disadvantage can be eliminated. The rapid hardening adhesive agent is also used in the art described in the above-described Published Unexamined Japanese Patent Application No. 81641/1995. However, since this adhesive agent has a high initial viscosity, fluctuations occur in the thickness of a bead of the adhesive agent when the bead is crushed (i.e., pushed or forced out of shape) by the pushing of the window glass. Therefore, the control of the pushing force becomes troublesome.

As a solution, there has recently been used a hot melt type of one-liquid urethane adhesive agent which has added thereto a thermoplastic resin. Since this adhesive agent is low in initial viscosity, the control of the pushing force becomes easy. In addition, the viscosity of the adhesive agent increases with a lowering (or decrease) in the temperature of the adhesive agent. Therefore, there can be obtained a function of temporarily holding the window glass, and there is an advantage in that the temporary holding member becomes unnecessary.

While the hot melt adhesive agent has various advantages as described hereinabove, it has also the following disadvantages. Namely, the temperature of the adhesive agent lowers between the time of applying the adhesive agent to the window glass and the time of pushing the window glass to the window frame, resulting in too high a viscosity. If the temperature of the adhesive agent is increased, it takes time before the temporary holding function can be obtained, resulting in a troublesome temperature control.

Furthermore, if the hot melt adhesive agent that has been applied to the window glass comes into contact with the window frame, the hardening of the adhesive agent is accelerated by the temperature decrease due to thermal shrinkage. As a result, the pushing force required to crush the bead of the adhesive agent to a required thickness increases. Here, in case there is provided a jig for the window glass at a front end of a robot arm, there is applied to the front end of the robot arm a pushing reaction force in a direction which is normal to the window portion. With the increase in the pushing force, the bending moment which is applied to the robot arm also increases. Then, due to the deflection of the robot arm by the bending moment, the jig is tilted in the direction in which the bending moment is applied, with the result that the window glass can no longer be mounted in an ordinary pushed state.

In view of the above-described points, the present invention has an object of facilitating a satisfactory mounting of a window glass only by controlling the temperature of an adhesive agent when the adhesive agent is applied to the window glass, and also to facilitate the mounting of the window glass to the window portion of the vehicle body in a normal pushed state even if a deflection occurs to a robot arm.

SUMMARY OF THE INVENTION

In order to attain the above and other objects, the present invention is a method of mounting a vehicular window glass in which the window glass to which a hot melt adhesive agent is applied is pushed to a window frame of a vehicle body while the window glass is held by a jig which is mounted on a robot. The method comprises the steps of: setting an allowable range of temperature of the adhesive agent, an upper limit of the range being defined to be an upper limit temperature of the adhesive agent at which the adhesive agent possesses such a holding force above a predetermined value as to prevent deviation of the window glass, a lower limit of the range being defined to be a lower limit temperature of the adhesive agent at which a compression reaction force when a bead of the adhesive agent applied to the window glass is crushed to a predetermined thickness becomes smaller than a predetermined value; and applying the adhesive agent to the window glass at such a temperature of the adhesive agent that the temperature of the adhesive agent at the time of completion of pushing of the window glass falls within the allowable range.

According to this method, at the time of completing the pushing of the window glass, the temperature of the adhesive agent is below the above-described upper limit, whereby the function of temporarily holding the window glass can be obtained. In addition, since the temperature of the adhesive agent is above the above-described lower limit, the bead of the adhesive agent can be crushed to a required thickness with a relatively small force without much trouble. The window glass can thus be well mounted without giving rise to fluctuations in the thickness in the bead of the adhesive agent.

Due to the difference in time between the start of applying the adhesive agent to the window glass and the completion of applying thereof, the temperature of the adhesive agent at the initial portion of applying thereof becomes lower than the temperature of the adhesive agent at the final portion of applying thereof. Here, if the temperature of the adhesive agent at the initial portion of applying thereof becomes lower than the above-described lower limit, the bead thickness is likely to fluctuate. Therefore, it is preferable to arrange that the temperature of the adhesive agent at the initial portion of applying thereof falls within the above-described allowable range at the time of completion of pushing the window glass.

Further, if the time of pushing the window glass is delayed due to an abnormality such as the line stopping or the like, the temperature of the adhesive agent that has been applied to the window glass sometimes falls below the lower limit temperature at the time of pushing the window glass. As a solution, it is preferable to heat the adhesive agent that has been applied to the window glass by means of a heating means which is provided in a suitable place. In this case, since the lowering of the temperature of the adhesive agent varies with the ambient temperature, the adhesive agent can be adequately heated without an excessive heating nor insufficient heating by operating the heating means at a predetermined timing according to the ambient temperature.

In case the jig is provided at the front end of the robot arm, there can be taken the following steps, i.e., the steps of supporting the jig at the front end of the robot arm such that the jig is tiltable relative to the robot arm in a direction in which a bending moment is applied to the robot arm, the bending moment being due to a load on the front end of the robot arm in a direction which is normal to the window portion of the vehicle; positioning the jig such that the window glass lies right opposite to the window portion in a state in which the tilting of the jig is restrained; and thereafter advancing the jig in the direction which is normal to the window portion of the vehicle to thereby push the window glass to a window frame of the window portion in a state of releasing the restraining of tilting.

When a hot melt type of adhesive agent is used as the adhesive agent for the window glass, there is an increase in the pushing reaction force which is applied to the front end of the robot arm in the direction which is normal to the window portion. By the bending moment due to this pushing reaction force, there occurs a deflection of the robot arm. However, since the restraining of the jig is released when the window glass is pushed, the jig tilts relative to the robot arm in a direction which is opposite to the direction of deflection of the robot arm. Due to this tilting, the deflection of the robot arm is absorbed and the tilting, relative to the window portion, of the jig, i.e., the window glass can be prevented. In this manner, even if the robot arm is deflected, the window glass can be mounted on the window portion in a state of ordinary pushing of the window glass.

If the restraining of the jig is released from the beginning at the time when the jig is advanced, there is a possibility that the jig tilts freely whereby the position of adhering the window glass to the window frame may deviate. On the other hand, in the step of advancing the jig in the direction which is normal to the window portion of the vehicle, if the window glass is pushed first to the window frame with a relatively weak force in a state in which the tilting of the jig is restrained, and then the window glass is pushed with a relatively strong force to the window frame in a state in which the restraining of the tilting of the jig is released, the adhesive agent of the window glass comes into contact with the window frame in a state in which the tilting of the jig is kept restrained. Therefore, there will occur no deviation in the position of adhering the window glass to the window frame.

The apparatus for carrying the above-described method into effect comprises: a coupling member for coupling the jig to the front end of the robot arm such that the jig is tiltable relative to the robot arm in a direction in which a bending moment is applied to the robot arm, the bending moment being due to a load on the front end of the robot arm in a direction which is normal to the window portion of the vehicle; and a restraining member which restrains the tilting of the jig. There is a case in which, at the front end of the robot arm, a wrist is provided which has a freedom of movement about an axis which extends in a direction normal to the window portion, and the jig is coupled to the wrist via the coupling member. In this case, it is preferable to constitute the coupling member by a joint which tilts the jig in an arbitrary direction. Then, even if the direction of the robot arm relative to the jig varies by the rotation of the wrist, the robot arm can advantageously be tilted in a direction in which the deflection of the robot arm can be absorbed.

Further, it is conceivable to arrange that the jig can be advanced in the direction which is normal to the window portion by the movement of the robot arm. However, it is preferable to provide a pushing means which supports the jig on the front end of the robot arm so as to be movable in a direction which is normal to the window portion of the vehicle body and advances the jig in the normal direction, and to arrange the pushing force of the pushing means to be switchable. Then, the switching between the weak pushing in a state of restraining the tilting of the jig and the strong pushing in a state of tilting the jig becomes easy.

Further, in case the window glass is held by sucking it with suction members which are provided in the jig, the pushing force is transmitted to the window glass via the suction members. In order to strongly push that portion of the window glass which is away from the suction members, it is preferable to provide pushing members which push predetermined portions of the window glass. In this case, when the window glass is pushed by the pushing members, the pushing reaction force which is applied to the front end of the robot arm increases. Therefore, it is preferable to push the window glass by the pushing members after the restraining of tilting of the jig has been released.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
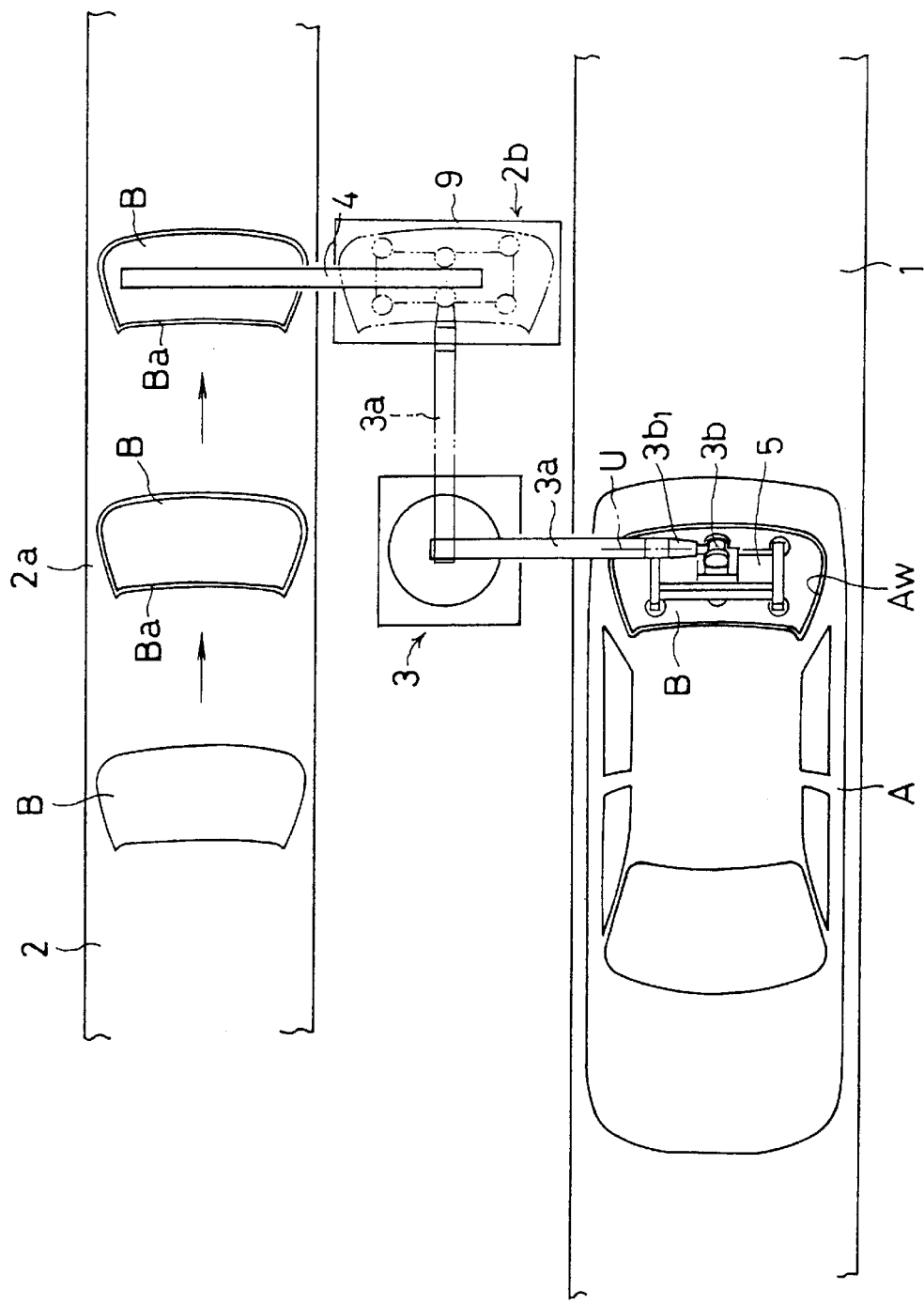
FIG. 1 is a plan view showing an overall arrangement of an apparatus for mounting a vehicular window glass of the present invention.

With reference to FIG. 1, reference numeral 1 denotes a transporting path to transport a motor vehicle body A. Reference numeral 2 denotes a supply path to supply a window glass B. After having applied or coated an adhesive agent to the window glass B at a coating station 2a on the supply path 2, the window glass B is transferred at a transfer station 2b via a transfer device 4 to a robot 3 which is disposed beside the transport path 1. The window glass B is then mounted on (or attached to) a window portion Aw of the vehicle body A which is stopped in a predetermined position on the transport path 1.

The robot 3 is an articulated type of robot. It holds the window glass B by means of a jig 5 which is attached to a wrist 3b at a front end of a robot arm 3a.

Figure 2:
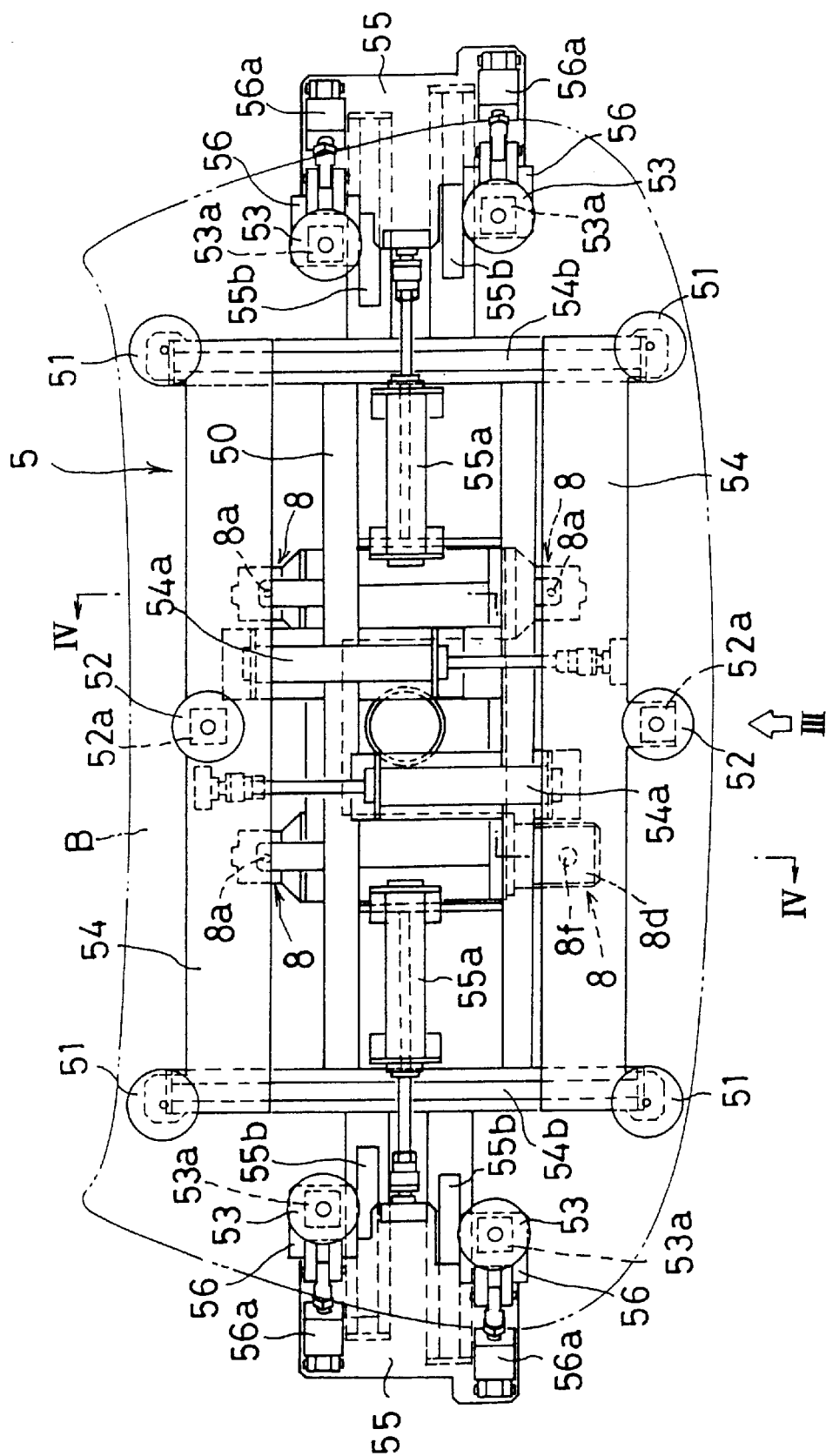
FIG. 2 is a front view of a jig.
Figure 3:
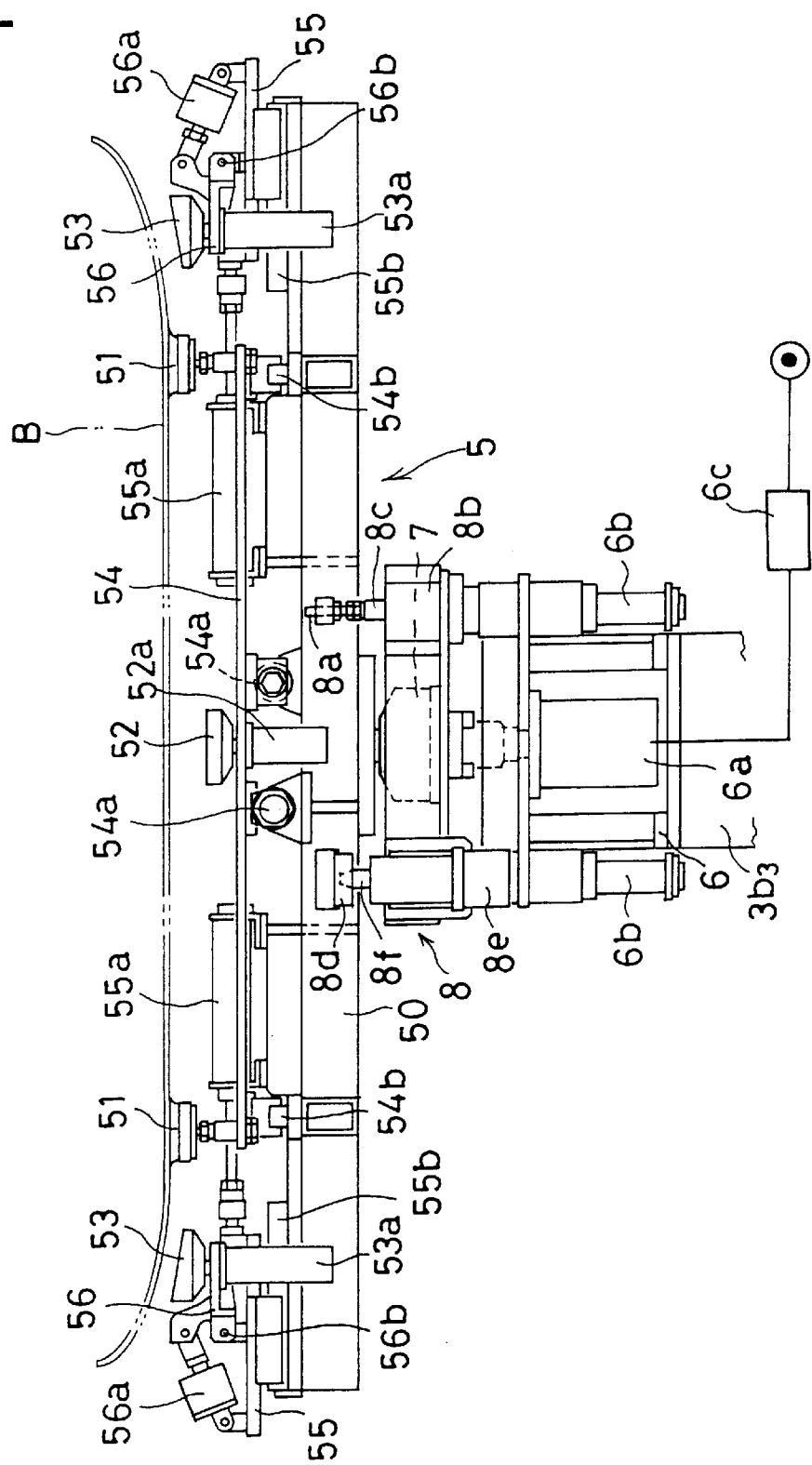
FIG. 3 is a view as seen in the direction of an arrow III in FIG. 2.
Figure 4:
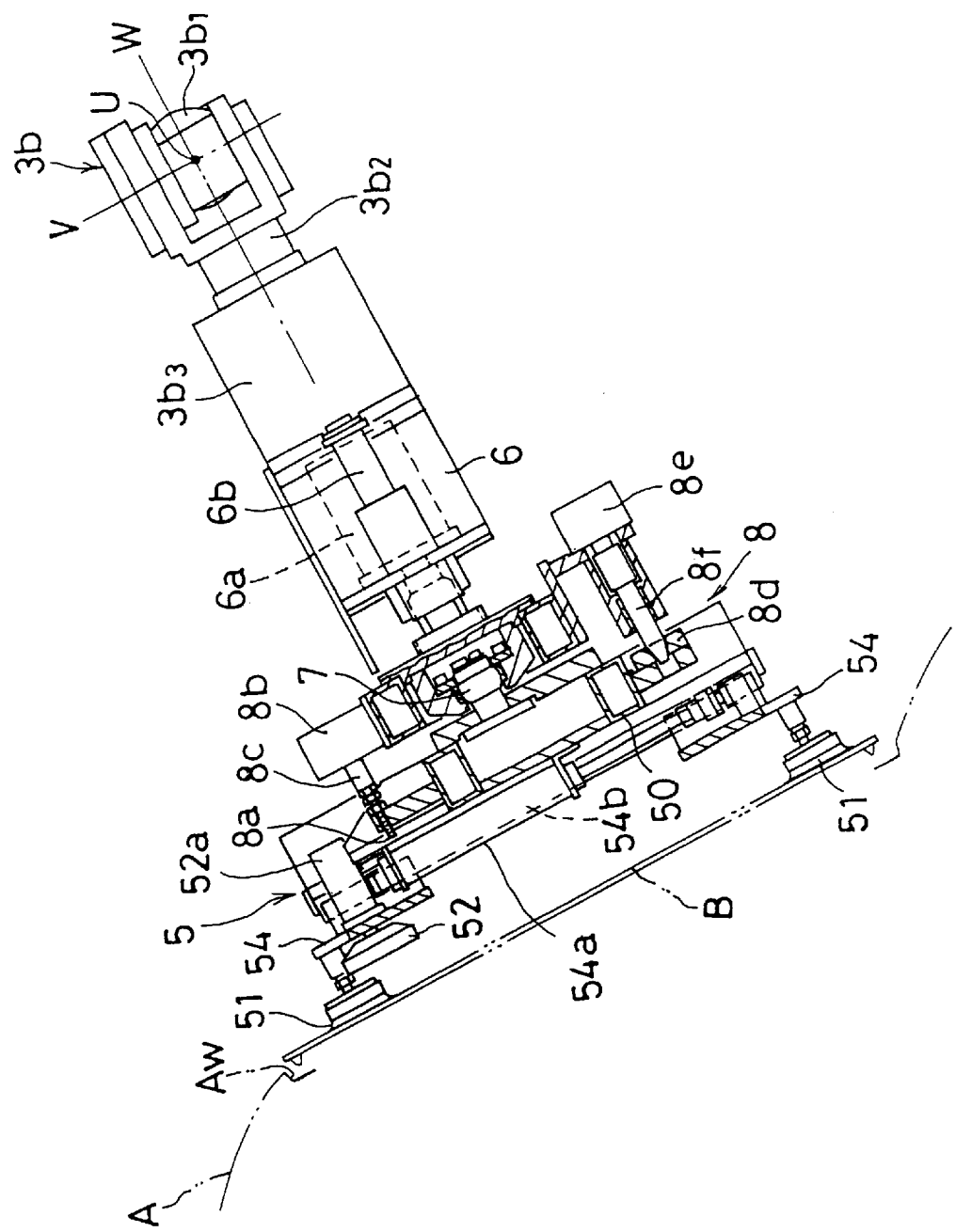
FIG. 4 is a sectional view taken along the line IV—IV in FIG. 2.

The jig 5 is made up, as shown in FIGS. 2 through 4, of the following members which are mounted on a jig main body 50: i.e., four suction members 51 each of which is made of a vacuum suction pad for sucking the window glass B; a pair of first upper and lower pushing members 52 which push the laterally (i.e., in the right and left direction in FIGS. 2 and 3) central portion of the upper edge portion and the lower edge portion, respectively, of the window glass B; and two sets, each set being made of a pair, of second right and left pushing members 53 each pair of which push an upper point and a lower point of the right edge portion or the left edge portion of the window glass B.

In order to cope with window glasses of different sizes, the jig main body 50 is provided with a pair of upper and lower laterally elongated slide frames 54 which are moved by respective cylinders 54a in the up and down direction along rails 54b which are fixed to the jig main body 50. The suction members 51 are mounted on the right and left end portions of each of the slide frames 54. In the central portion of each of the slide frames 54, there is mounted the first pushing member 52 so as to be movable by a cylinder 52a toward and away from the window glass B.

Further, on each of the right and left side portions of the jig main body 50, there is provided a slide frame 55 which laterally moves along a rail 55b which is fixed to the jig main body 50. Each of the slide frames 55 is provided with a pair of upper and lower tilting frames 56 which are tilted or inclined with a pivot shaft 56b functioning as a center of pivoting. Each of the tilting frames 56 is provided with a second pushing member 53 so as to be movable back and forth by means of a cylinder 53a. It is thus so arranged that, by the tiling of the tilting frame 56, the direction of back and forth movement of the second pushing member 53 can be changed according to the degree of warping (or bending) in the right and left side portions of the window glass B.

The wrist 3b (FIG. 4) is made up of a wrist of three-axis construction having: a first member $3b_1$ which is rotatable about a U axis which extends in the axial direction of the robot arm; a second member $3b_2$ which is rotatable about a V axis which crosses the U axis at right angles; and a third member $3b_3$ which is rotatable about a W axis which crosses the V axis at right angles. The third member $3b_3$ is provided with a supporting frame 6 which moves back and forth in the W axis direction guided by guide bars 6b by means of a cylinder 6a which serves as a pushing means. The jig 5 is supported on the supporting frame 6 in a manner tiltable in a desired direction via a coupling member 7 which is made up of a spherical joint. The pushing force of the cylinder 6a can be switched between a strong force and a weak force by a proportional valve 6c which is interposed in a fluid supply passage of the cylinder 6a.

Between the supporting frame 6 and the jig 5, there is provided a restraining means 8 which restrains the tilting of the jig 5. The restraining means 8 is made up of restraining pins 8c and a taper pin 8f. Each of the restraining pins 8c comes into contact with contact bolts 8a mounted on three portions of the jig main body 50, and is moved back and forth by a cylinder 8b. The taper pin 8f is engaged with a taper guide 8d mounted on one portion of the jig main body 50, and is moved back and forth by a cylinder 8e. The tilting of the jig 5 is restrained by the forward movement of these restraining pins 8c and the taper pin 8f. In case where the coupling member 7 is constituted by the spherical joint as in this embodiment, the jig 5 becomes capable of rotating about the W axis. In order to prevent this rotation of the jig 5, the taper guide 8d and the taper pin 8f are provided. However, if the coupling member 7 is constituted by a coupling such as a Hooke's universal coupling or the like which allows for only the tilting movement, the taper guide 8d and the taper pin 8f are not required.

Figure 5:
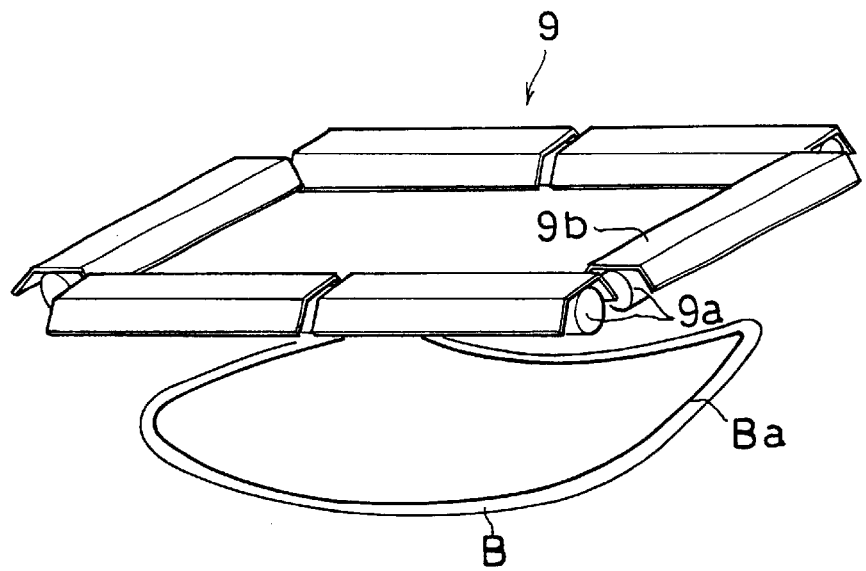
FIG. 5 is a perspective view of a heating means.

With reference to FIG. 1, a heating means 9 is disposed in the transfer station 2b. This heating means 9 is constituted, as shown in FIG. 5, by reflectors 9b and by infrared lamps 9a which irradiate infrared rays toward that portion of the window glass B to which an adhesive agent has been applied.

In operation of mounting the window glass B on the window portion Aw of the vehicle body A, first, the robot arm 3a is swung or rotated to the side of the transfer station 2b. The window glass B to which the adhesive agent has been applied is held by the jig 5 via the suction members 51. Then, the robot arm 3a is rotated to the side of the vehicle body A to thereby move the robot arm 3a to a predetermined vehicle body measuring position. The position of the window portion Aw of the vehicle body A is measured by means of visual sensors (not illustrated) which are mounted on the supporting frame 6 and the jig 5. Then, based on the measured positional data, the teaching data of the robot are corrected. The robot arm 3a and the wrist 3b are moved to position the jig 50 so that the window glass B is located right opposite the window portion Aw. FIG. 4 shows the state of this positioning. In this state, the tilting of the jig 5 is restrained, and the W axis coincides with the normal line of the window portion Aw.

Figure 6A:
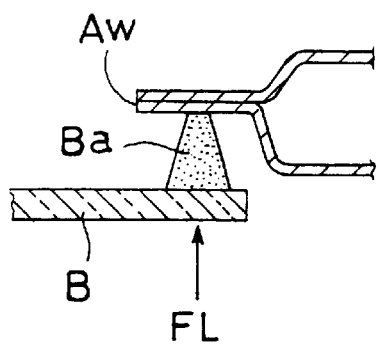
FIG. 6A is a sectional view showing a condition in which the window glass is weakly pushed.

Thereafter, while the tilting of the jig 5 is restrained, the jig 5 is moved forward in the normal direction of the window potion Aw by the extension of the cylinder 6a. At this time, the pushing force of the cylinder 6a is set slightly weaker. As shown in FIG. 6A, it is so arranged that the window glass B is pushed to the window frame of the window portion Aw by a relatively weak force FL so that a bead Ba of the adhesive agent is slightly crushed (i.e., slightly pushed or forced out of shape).

Figure 6B:
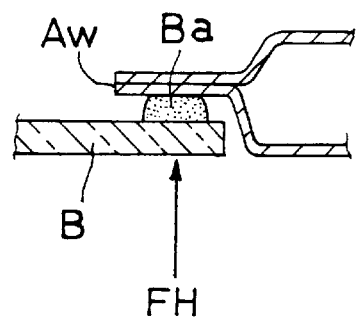
FIG. 6B is a sectional view showing a condition in which the window glass is strongly pushed.

Thereafter, the restraining pins 8c and the taper pin 8f are moved backward to thereby release the tilting restraint, and the pushing force of the cylinder 6a is set relatively strong. Also, the window glass B is pushed by both the first and the second pushing members 52, 53. According to these operations, as shown in FIG. 6B, the window glass B is pushed to the window frame with a relatively strong force FH, and the bead of the adhesive agent is crushed down to a predetermined thickness. Thereafter, after passage of a predetermined holding time, the suction of the window glass B by means of the suction members 51 is released. The jig 5 is moved backward in the normal direction of the window portion Aw by the contraction of the cylinder 6a, whereby the jig 5 is detached from the window glass B. One set of the mounting operations are thus completed.

Figure 7:
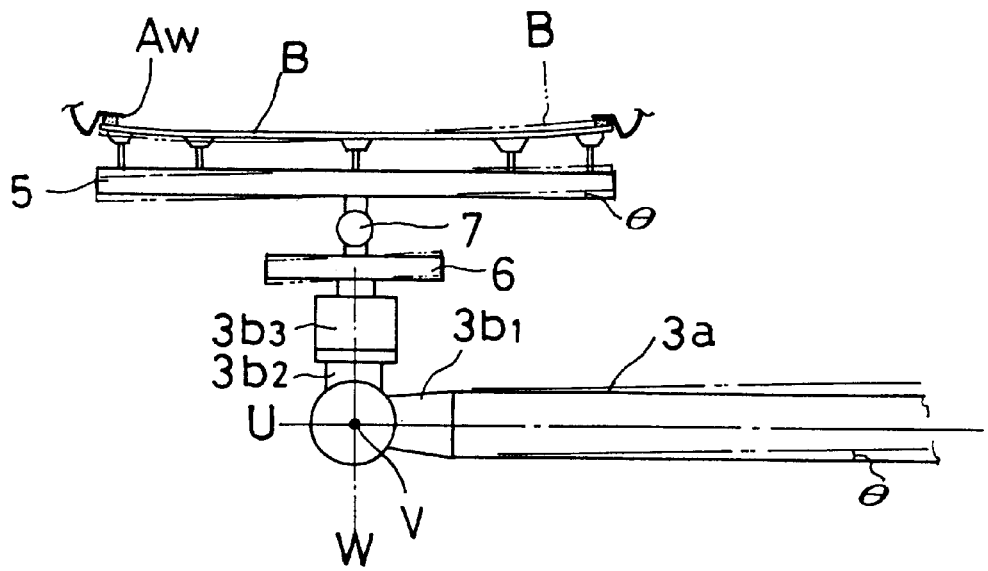
FIG. 7 is a view showing the relationship between the deflection of the robot arm and the tilting of the jig.

When one-liquid type urethane adhesive agent of hot melt type is used as the adhesive agent, the window glass B can be temporarily held after passage of a holding time of 6–8 seconds. On the other hand, if this kind of hot melt adhesive agent is used, the load required for the crushing of the bead Ba of the adhesive agent increases by the acceleration of hardening due to thermal shrinking after its contact with the window frame. As a result, due to a pushing reaction force in the normal direction of the window portion Aw, the bending moment which is applied to the robot arm 3a increases. The robot arm 3a consequently deflects as shown by imaginary lines in FIG. 7. In this case, if the jig 5 is fixed to the supporting frame 6, the jig 5 will tilt relative to the window portion Aw by an amount of deflection angle θ due to the deflection of the robot arm 3a. As a consequence, there will occur a lifting of side edges of the window glass B on the front side of the robot arm 3a, whereby the window glass B cannot be mounted in an ordinary pushed state.

On the other hand, according to the present invention, at the time when the window glass B is strongly pushed, the restraining against the tilting of the jig 5 is released. Therefore, even if the robot arm 3a is deflected due to the bending moment by the pushing reaction force, the jig 5 is tilted relative to the robot arm 3a in the direction opposite to the direction of the deflection. Due to this tilting, the deflection of the robot arm 3a is absorbed. Therefore, the window glass B can be mounted on the window portion Aw in an ordinary pushed state in which the bead Ba of the adhesive agent is evenly crushed over the entire circumference.

Figure 8:
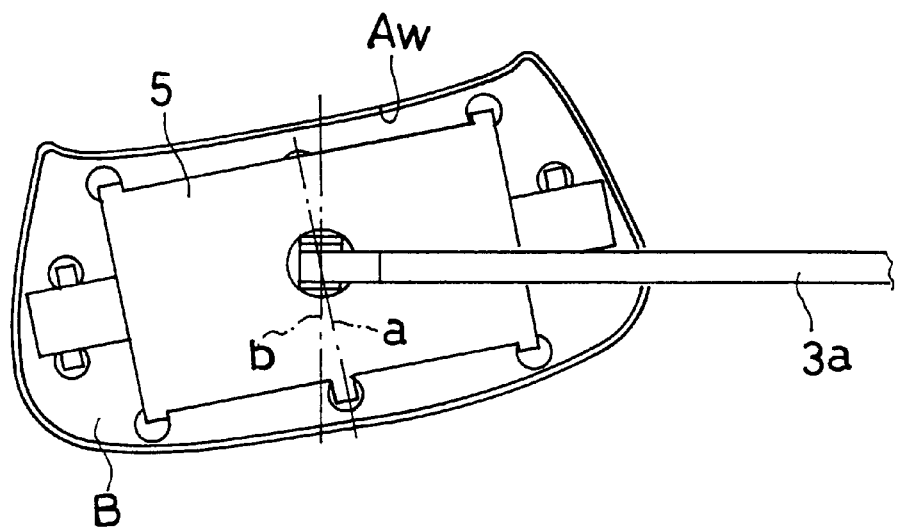
FIG. 8 is a view showing the axial line of tilting when the direction of the robot arm varies relative to the jig.

When the window portion Aw is tilted as seen in the lateral direction due to the tilting (or inclination) of the vehicle body A, the third member $3b_3$ of the wrist 3b is rotated about the W axis to thereby laterally tilt the jig 5 in a similar manner as the window portion Aw. In this case, as shown in FIG. 8, the lateral width direction of the jig 5 is tilted relative to the longitudinal direction of the robot arm 3a. Here, if the coupling member 7 is constructed so as to have only one freedom of tilting about one axial direction which crosses the lateral width direction of the jig 5 at right angles as shown by "a" in FIG. 8, the axial line "a" of tilting of the jig 5 will no longer cross the longitudinal direction of the robot arm 3a at right angles. As a result, the deflection of the robot arm 3a can no longer be completely absorbed. On the other hand, in the present embodiment, the jig 5 is arranged to be tiltable in an arbitrary direction by means of the coupling member 7. Therefore, the jig 5 tilts about an axis which is shown in FIG. 8 as b and which crosses the robot arm 3a at right angles to the longitudinal direction of the robot arm 3a. The deflection of the robot arm 3a can thus be completely absorbed.

Figure 9:
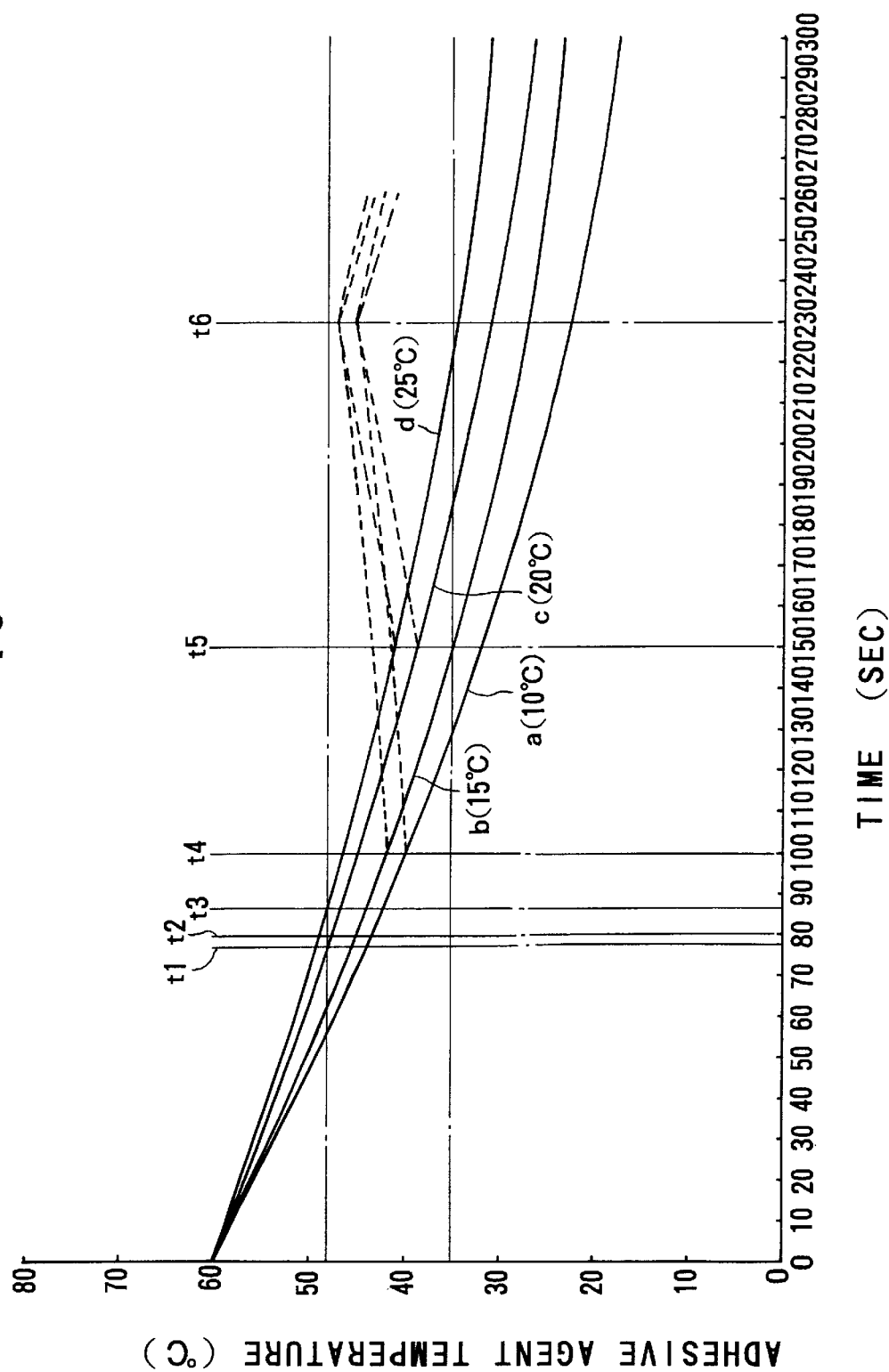
FIG. 9 is a graph showing the change in temperature in the adhesive agent.

FIG. 9 shows cooling properties of the adhesive agent when there was used one-liquid type of hot melt urethane adhesive agent with an addition of a thermoplastic resin. Zero second on the abscissa is the time of starting to apply the adhesive agent to the window glass B. Time t1 is the time of starting to push the window glass B. Time t2 is the time of switching from a weak pushing to a strong pushing. Time t3 is the time of completion of pushing. Here, at the coating station 2a, the adhesive agent is applied from one circumferential point toward one circumferential direction. The coating work is finished when one round of the window glass B has been applied. It takes about 20 seconds to finish the coating work. Thereafter, the window glass B is transferred to the transfer station 2b and is kept waiting there. The vehicle body is discharged and the next vehicle body is transported into position, and the window glass B is handed over to the jig 5. Thereafter, the positioning of the jig 5 is performed to thereby start the pushing of the window glass B. The time t1 corresponds to about 78 seconds, the time t2 corresponds to about 80 seconds, and the time t3 corresponds to about 86 seconds. Further, the temperature of the adhesive agent shown in FIG. 9 is the temperature of the adhesive agent at the portion at which the application of the adhesive agent to the window glass B is started. In the graph, curve "a", curve b, curve c, and curve d show the temperatures of the adhesive agent at an ambient temperatures of 10° C., 15° C., 20° C., and 25° C., respectively.

Figure 10:
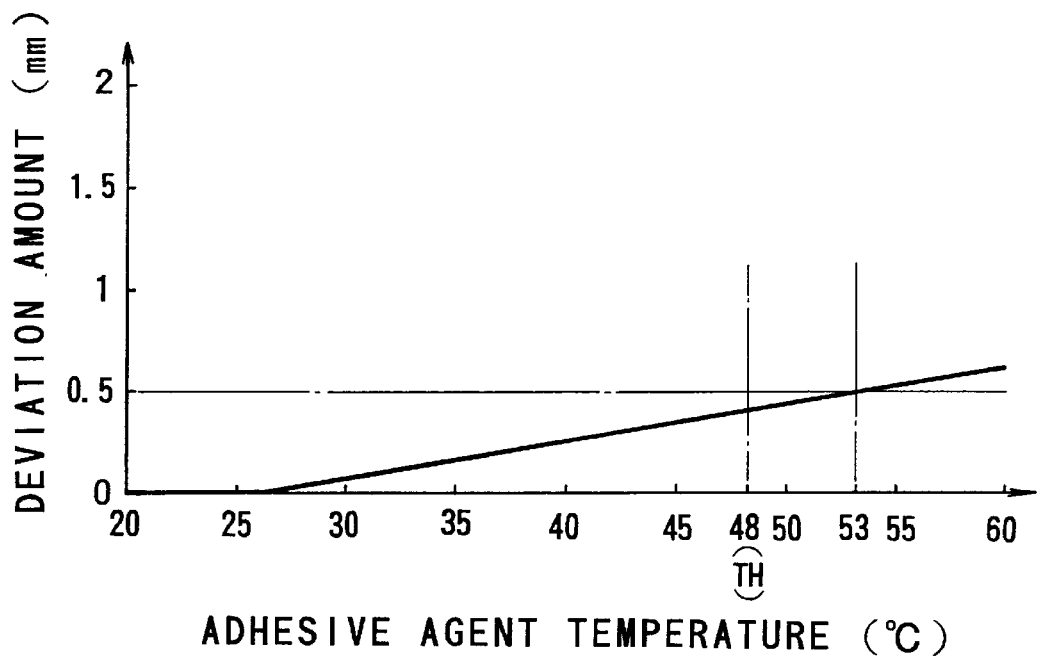
FIG. 10 is a graph showing the relationship between the amount of deflection of the window glass and the temperature of the adhesive agent.

After the window glass B has been mounted, the window glass B was pulled slantingly downward along the window surface such that a creep force of 24 g/cm per unit length is added to the adhesive agent on the right and the left sides of the window glass B. The amount of deviation of the window glass B at a lapse of 10 minutes was measured. The amount of deviation varied, as shown in FIG. 10, with the temperature of the adhesive agent at the time of completion of the pushing. This temperature of the adhesive agent is the temperature of the adhesive agent at the portion of starting the application of the adhesive agent to the window glass B. In order to obtain the function of temporarily holding the window glass B, the amount of deviation at the creep force of 24 g/cm must be below 0.5 mm. For that purpose, the temperature of the adhesive agent at the time of completion of pushing must be below 53° C. Even taking fluctuations into consideration, if the temperature of the adhesive agent at the portion of starting the application of the adhesive agent is below 48° C. at the time of completion of pushing, the function of temporarily holding the window glass B can be sufficiently secured.

Figure 11:
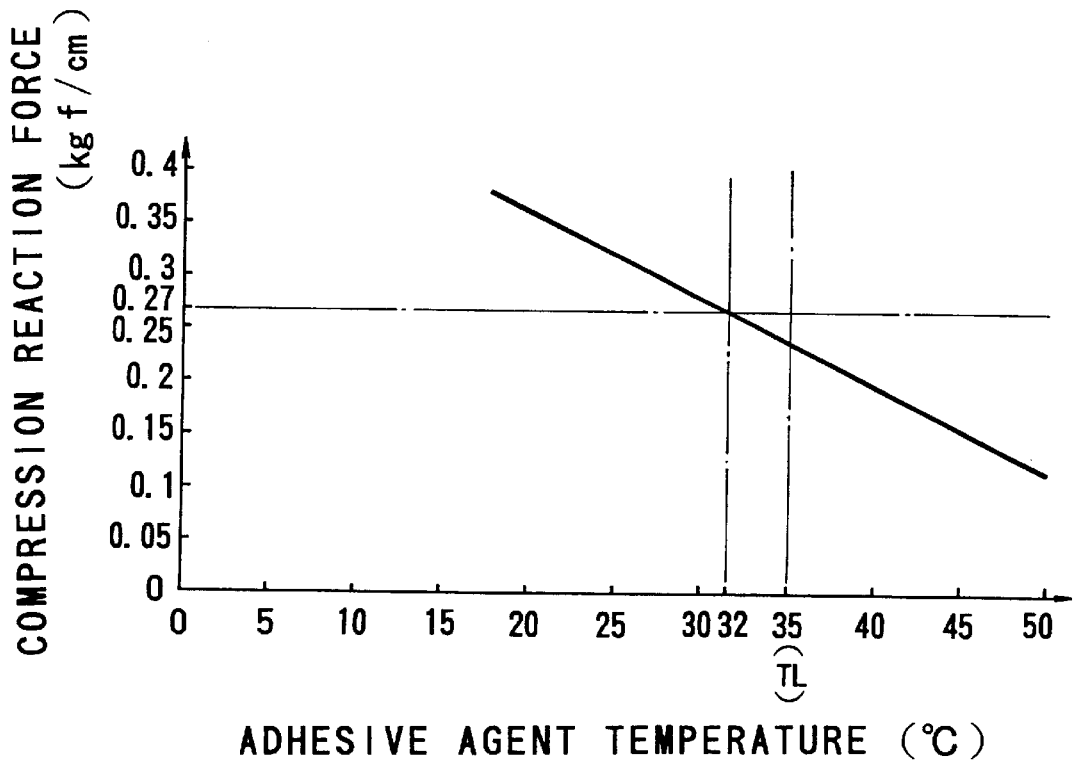
FIG. 11 is a graph showing the relationship between the compression reaction force of the adhesive agent and the temperature of the adhesive agent.

Further, the cross sectional shape of the bead of the adhesive agent Ba is a triangle of 8 mm in width and 12 mm in height. This is crushed by the strong pushing to a bead thickness of 7 mm. FIG. 11 shows the relationship between the compression reaction force and the temperature of the adhesive agent when the bead Ba of the adhesive agent was crushed as explained above. If the compression reaction force becomes large, the reaction force which is applied to the robot arm 3a via the jig 5 also becomes large, with the result that a deflection occurs to the robot arm 3a by the bending force due to this reaction force. In this case, by the operation of the coupling member 7, the jig 5 tilts in the direction opposite to the direction of its deflection relative to the robot arm 3a, whereby the deflection of the robot arm 3a is absorbed. However, if the compression reaction force per unit length of the bead Ba exceeds 0.27 kgf/cm, the deflection of the robot arm 3a can no longer be absorbed by the tilting of the jig 5. It becomes, therefore, difficult to evenly crush the bead Ba of the adhesive agent over the entire circumference of the window glass B. It is when the temperature of the adhesive agent is above 32° C. that the compression reaction force falls below 0.27 kgf/cm. Even taking the fluctuations into consideration, if the temperature of the adhesive agent is above 35° C. at the time of completion of pushing the window glass B, the window glass B can be mounted without giving rise to the fluctuation in the bead thickness. Due to the time difference (20 seconds) between the start of applying the adhesive agent to the completion of its application, the temperature of the adhesive agent at the initial portion of applying the adhesive agent becomes lower than the temperature at the portion of completion of application thereof. Even if the temperature of the adhesive agent is above 35° C. at the portion of completion of applying the adhesive agent at the time of completion of pushing of the window glass B, the temperature of the adhesive agent at the remaining portions will be lower than 35° C. As a result, there is a possibility that the fluctuation occurs to the thickness of the bead.

As a solution, in the present embodiment, there is set an allowable range between a lower limit TL of 35° C. and an upper limit TH of 48° C. The adhesive agent is then applied to the window glass B at such a temperature of the adhesive agent that, at the time of completion of pushing the window glass B, the temperature of the adhesive agent at the initial portion of applying thereof falls within the allowable range. As can be seen from FIG. 9, if the temperature of the adhesive agent is set to 60° C. at the time of applying thereof, the temperature of the adhesive agent at the initial portion of applying thereof at the time of completion of pushing the window glass B falls within the allowable range even if the ambient temperature varies between 10° C. and 25° C. Since the ambient temperature inside the site of manufacturing the motor vehicles normally falls within the range of 10° C. through 25° C., the temperature of the adhesive agent at the time of applying thereof is set to 60° C. If the ambient temperature exceeds 25° C., the temperature of the adhesive agent at the time of applying thereof is made lower than 60° C.

Further, in case the operation of mounting the window glass B is delayed due to the occurrence of an abnormal state such as the stopping of the manufacturing line, or the like, the window glass B to which the adhesive agent has already been applied is transported to the transfer station 2b and is kept waiting therein. In addition, when the window glass B has already been transferred to the jig 5, the window glass B is kept waiting in the transfer station 2b while it is held by the jig 5, and the heating means 9 is operated at a predetermined timing depending on the ambient temperature. In other words, the time of starting the operation of the heating means 9 is set to the point of time t4 in FIG. 9 at a lapse of 100 seconds from the start of applying the adhesive agent when the ambient temperature is below 15° C., and is set to the point of time t5 at a lapse of 150 seconds when the ambient temperature has exceeded 15° C. The operation of the heating means 9 is stopped at the point of time t6 at a lapse of 230 seconds. In this case, the temperatures of the adhesive agent increase as shown by the dotted line in FIG. 9 and fall within the allowable range. If the operation of the manufacturing line keeps on stopping after the lapse of the point of time t6, the heating means 9 is operated again at a timing depending on the ambient temperature which is determined by the lapse of time from the point of time t6. The temperature of the adhesive agent is thus arranged not to fall outside the allowable range.

An explanation has so far been made about an embodiment in which the window glass B is mounted by means of the robot 3 which is disposed beside the transporting path 1 of the vehicle body A. The present invention can, however, be applied to an embodiment in which the robot is of a hanger type disposed above the transporting path 1 and in which the window glass is held by a jig which is provided at a lower end of the robot arm.

It is readily apparent that the above-described method of, and apparatus for, mounting a window glass of a vehicle meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A method of mounting a vehicular window glass in which the window glass to which a hot melt adhesive agent is applied is pushed to a window frame of a vehicle body while the window glass is held by a jig which is mounted on a robot, said method comprising the steps of:

setting an allowable range of temperature of the adhesive agent, an upper limit of said range being defined to be an upper limit temperature of 48° C. of the adhesive agent at which the adhesive agent possesses such a holding force above a predetermined value as to prevent deviation of the window glass, a lower limit of said range being defined to be a lower limit temperature of 35° C. of the adhesive agent at which a compression reaction force when a bead of the adhesive agent applied to the window glass is crushed to a predetermined thickness becomes smaller than a predetermined value; and applying the adhesive agent to the window glass at such a temperature of the adhesive agent that the temperature of the adhesive agent at the time of completion of pushing of the window glass falls within said allowable range of 35° to 48° C.

2. A method of mounting a vehicular window glass according to claim 1, wherein the temperature of the adhesive agent at the time of.completion of pushing of the window glass is the temperature of the adhesive agent at an initial portion of applying the adhesive agent to the window glass.

3. A method of mounting a vehicular window glass according to claim 1 or 2, further comprising the steps of providing a heating means for heating the adhesive agent that has been applied to the window glass when the time of pushing the window glass is delayed due to an occurrence of an abnormality, and operating said heating means at a predetermined timing depending on an ambient temperature.

* * * * *